(12) United States Patent
Cookson

(10) Patent No.: US 6,874,246 B2
(45) Date of Patent: Apr. 5, 2005

(54) WEAR MEASUREMENT GAUGE FOR PADEYES SHACKLES AND CHAINS

(75) Inventor: Raymond Alec Cookson, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 10/255,781

(22) Filed: Sep. 26, 2002

(65) Prior Publication Data

US 2004/0060189 A1 Apr. 1, 2004

(51) Int. Cl.$^7$ ................................................ G01B 5/12
(52) U.S. Cl. .................................... 33/806; 33/810
(58) Field of Search ...................... 33/806, 807, 808, 33/783, 786, 785, 810, 811, 812, 542, 486, 487

(56) References Cited

U.S. PATENT DOCUMENTS

| | | | | |
|---|---|---|---|---|
| 1,402,497 A | * | 1/1922 | Hoffman | 33/810 |
| 1,659,915 A | * | 2/1928 | Hilfiker | 33/806 |
| 2,214,091 A | * | 9/1940 | Turquand | 33/486 |
| 2,311,323 A | * | 2/1943 | Addis | 33/812 |
| 2,339,031 A | * | 1/1944 | Rosenberg | 33/806 |
| 4,008,523 A | * | 2/1977 | von Voros | 33/785 |
| 4,416,063 A | * | 11/1983 | Nestor et al. | 33/810 |
| 4,837,936 A | * | 6/1989 | Lockhart | 33/783 |
| 5,083,380 A | * | 1/1992 | Robertson | 33/486 |
| 5,317,814 A | * | 6/1994 | Rogler | 33/810 |
| 5,697,163 A | * | 12/1997 | Ulrich | 33/811 |
| 5,918,377 A | * | 7/1999 | Ulrich | 33/783 |

* cited by examiner

*Primary Examiner*—Christopher W. Fulton
(74) *Attorney, Agent, or Firm*—Abelman, Frayne & Schwab

(57) ABSTRACT

A wear measurement device permits reliable and accurate measurements of wear and wear trends for fastening devices used in maritime applications, and on-shore facilities, such as chains, shackles, padeyes, anchor legs, and the like. The device utilizes a pair of arms slidable on a tube and positionable to contact out-of-plane surfaces and provide a direct reading of the distance between the surfaces from a scale containing dimensional indicia on the exposed surface of the supporting tube.

16 Claims, 4 Drawing Sheets

WEAR MEASUREMENT GAUGE FOR PADEYES SHACKLES AND CHAINS

BACKGROUND OF THE INVENTION

1. Field of the Invention

This invention is related to measurement devices, and in particular to devices for measuring wear experienced by padeyes, shackles, chains, and other similar elements used in maritime applications and on-shore installations.

2. Description of the Related Art

In maritime industry, fastening devices are used that are typically fabricated of metal; that is, metal elements with rings and/or hooks. Such fastening devices are attached to, and secure other fastening devices and/or portions of ships, barges and boats, for maritime applications using anchors, moorings, and the like for securing a ship to a dock or other facilities. Such fastening devices experience wear from frictional interaction between adjacent and/or abutting portions of the fastening devices, as well as, other eroding or corroding factors and sources such as oxidation, interaction with salt water, pollution, cleaning chemicals, etc. For example, the wear of padeyes, shackles, and chains has caused problems in the past including the loss of anchor leg moorings in ship berths. Accordingly, repairs and maintenance of ship berths, dry-docks, anchorages and other facilities employing these marine restraining devices must be continually assessed and addressed.

Because of such wear, erosion, and/or corrosion, potential damage and even the loss of berthed ships, as well as pollution and/or damage to adjacent facilities from breakaway vessels, can be the cause of potentially high costs and severe safety breaches. Necessary repairs and maintenance, as well as preventative measures, such as the temporary shutting down of critical facilities to undertake necessary, albeit costly, repairs, can result in severe economic damages and losses.

To minimize such costs, the regular inspection and replacement of worn fastening devices are essential. However, it has been found difficult to evaluate the degree of wear on such fastening devices, due to the inability of known devices to take reliable and accurate wear measurements.

The measurement devices of the prior art have not been able to provide reliable and accurate measurements. Thus, the appropriate assessment of wear of ship fastening devices has been frustrated due to, for example, the lack of visibility of the wear or the lack of reference surfaces for talking measurements. For example, reference surfaces can be inaccessible or out of a common plane with each other.

Using known measurement devices, the curved surfaces of such fastening devices prevent accurate measurements. Also, the portions of the fastening devices can be underwater without the opportunity to remove these devices out of the water, and so measurements may be unreliable due to poor visibility as well as the light-refraction effects of the surrounding water to gauge distances between components and portions of the fastening devices being measured.

In addition, ship fastening devices, whether on-shore or subsea often pose difficult problems in measurements by having a combination of a lack of visibility to the worn portions, a lack of accessible reference surfaces, and out-of-plane reference surfaces, being curved or being underwater.

In another example, direct visual assessment of wear between interconnected padeyes and shackles is made more difficult because the wear surfaces are typically hidden behind the shackle body.

Accordingly, a need exists for a reliable and accurate device for measuring the wear of chains, shackles, padeyes, and other fastening devices used in maritime applications, such as anchor legs.

It is therefore a principal object of the present invention to provide a reliable, easy to use and rugged tool for accurately measuring wear on the surfaces of chains and other fasteners in which the worn surfaces are out-of-plane.

SUMMARY OF THE INVENTION

A wear measurement device is disclosed which permits reliable and accurate measurements of wear and wear trends for fastening devices used in maritime and on-shore applications, such as chains, shackles, padeyes, anchor legs, and the like. The device of the invention determines and establishes the degree of wear to facilitate the scheduling of the maintenance, to thereby reduce the risk of damage and losses to the company owning and/or operating ships using such fastening devices at ports, berths, and/or other maritime facilities.

DETAILED DESCRIPTION OF THE INVENTION

Figure 1:
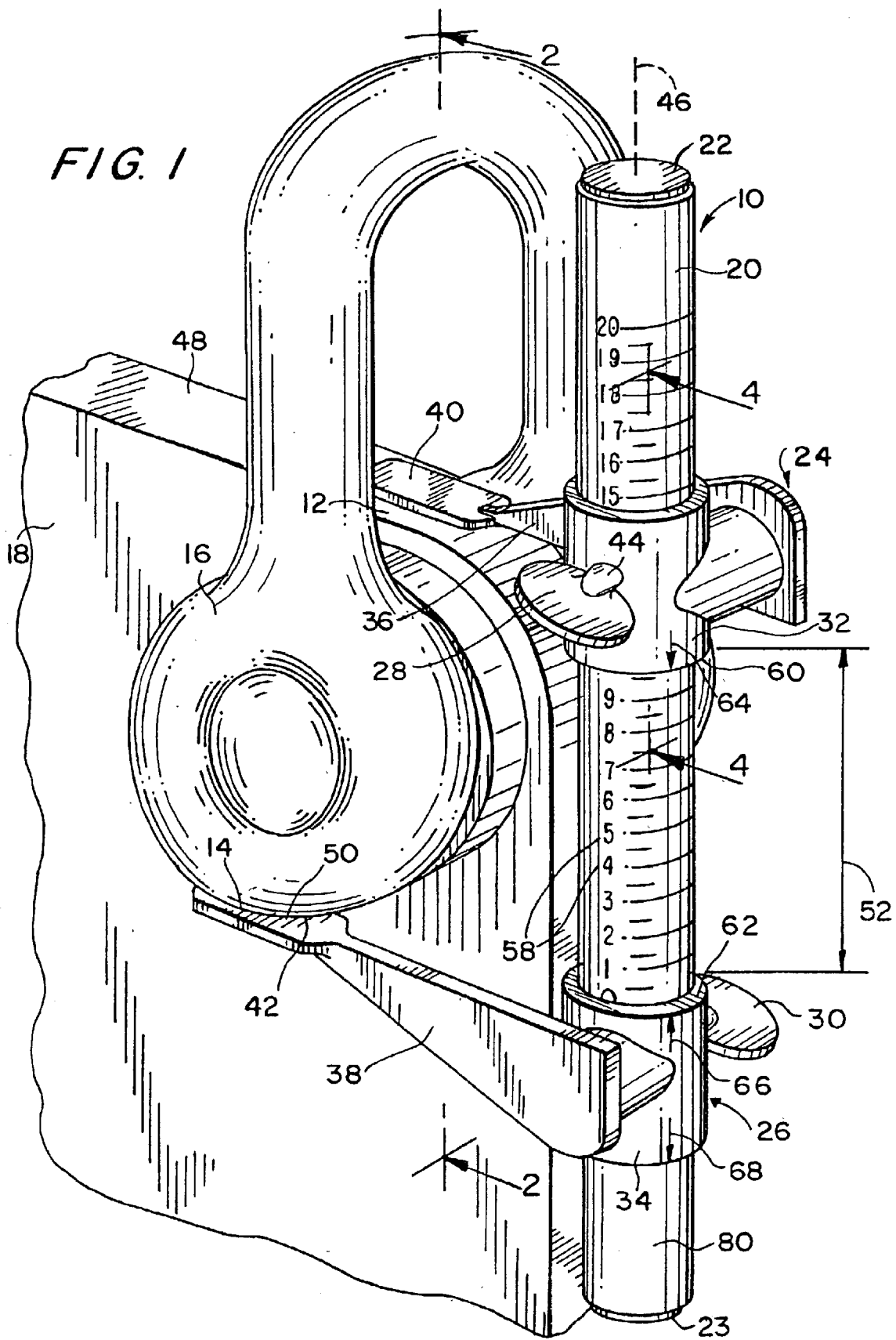
FIG. 1 is a perspective side view of the measurement device of the present invention measuring a reference dimension associated with an interconnected shackle and padeye.

Referring to FIG. 1, a wear measurement device 10 is disclosed for measuring distances between selected points 12, 14 associated with portions or components of a fastening device, such as interconnected padeyes 16, shackles 18, and links of chains or combination thereof. The wear measurement device 10 includes a tube 20, with the ends 22, 23 of the tube 20, being both open or both closed, or one end can be open while the other end is closed. Two slidable offset arms 24, 26 are mounted upon the tube 20, with the arms 24, 26 capable of being locked in place along the longitudinal length of the tube 20 using locking fasteners 28, 30, such as thumbscrews.

In an exemplary embodiment, each of the slidable arms 24, 26 includes a tubular section 32, 34, respectively, from which extends a respective arm portion 36, 38, having a respective flat surface 40, 42. Each of the tubular sections 32, 34 includes an aperture, such as the aperture 44 shown in FIGS. 1 and 4, passing through a wall of the tubular section 32, through which a respective one of the locking fasteners 28, 30 passes to frictionally secure the slidable arms 24, 26 to the tube 20 at the selected locations along the length of the tube 20.

Figure 2:
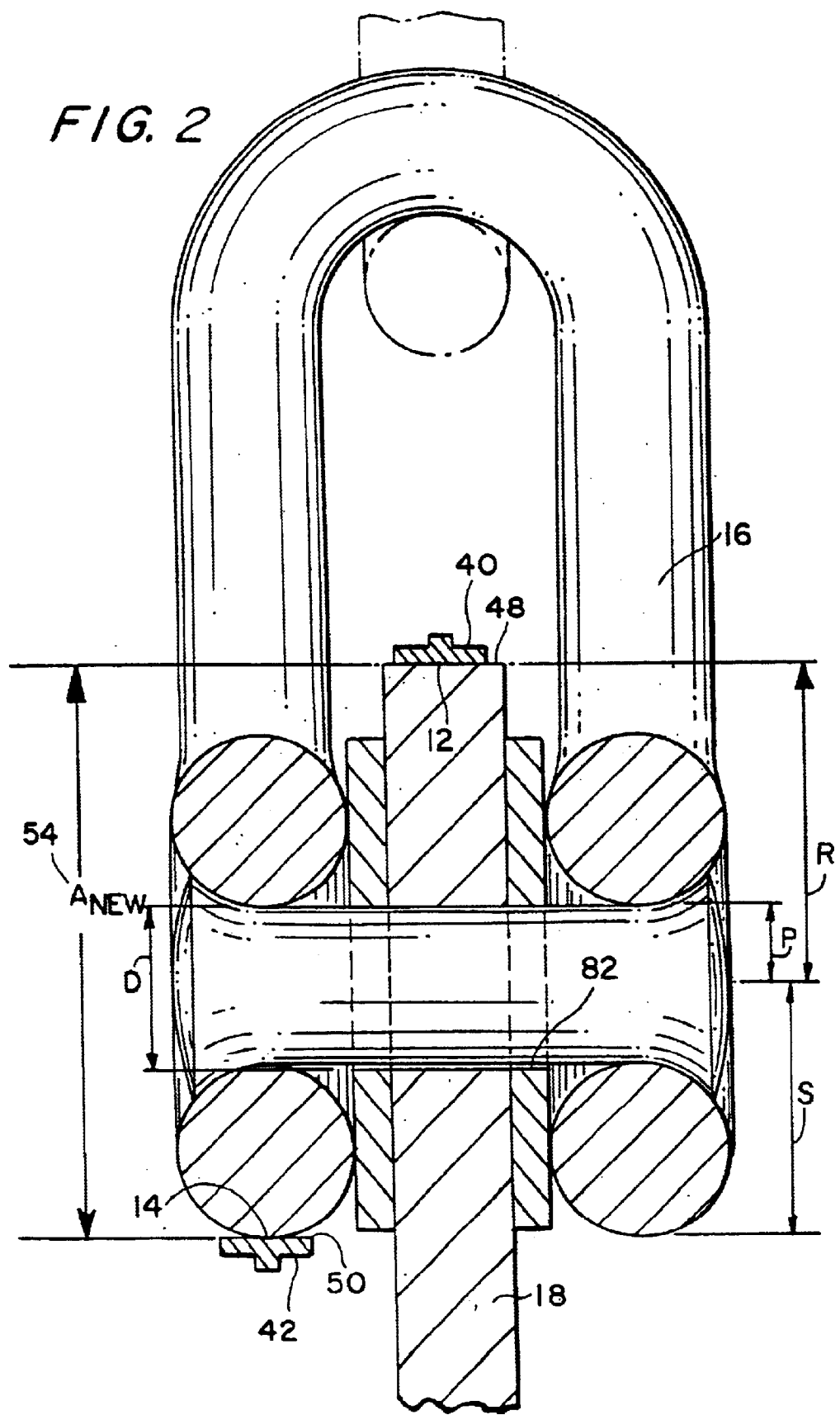
FIG. 2 is an elevational view, partially in cross-section, of the measurement device and interconnected shackle and padeye taken along lines 2—2 of FIG. 1.
Figure 3:
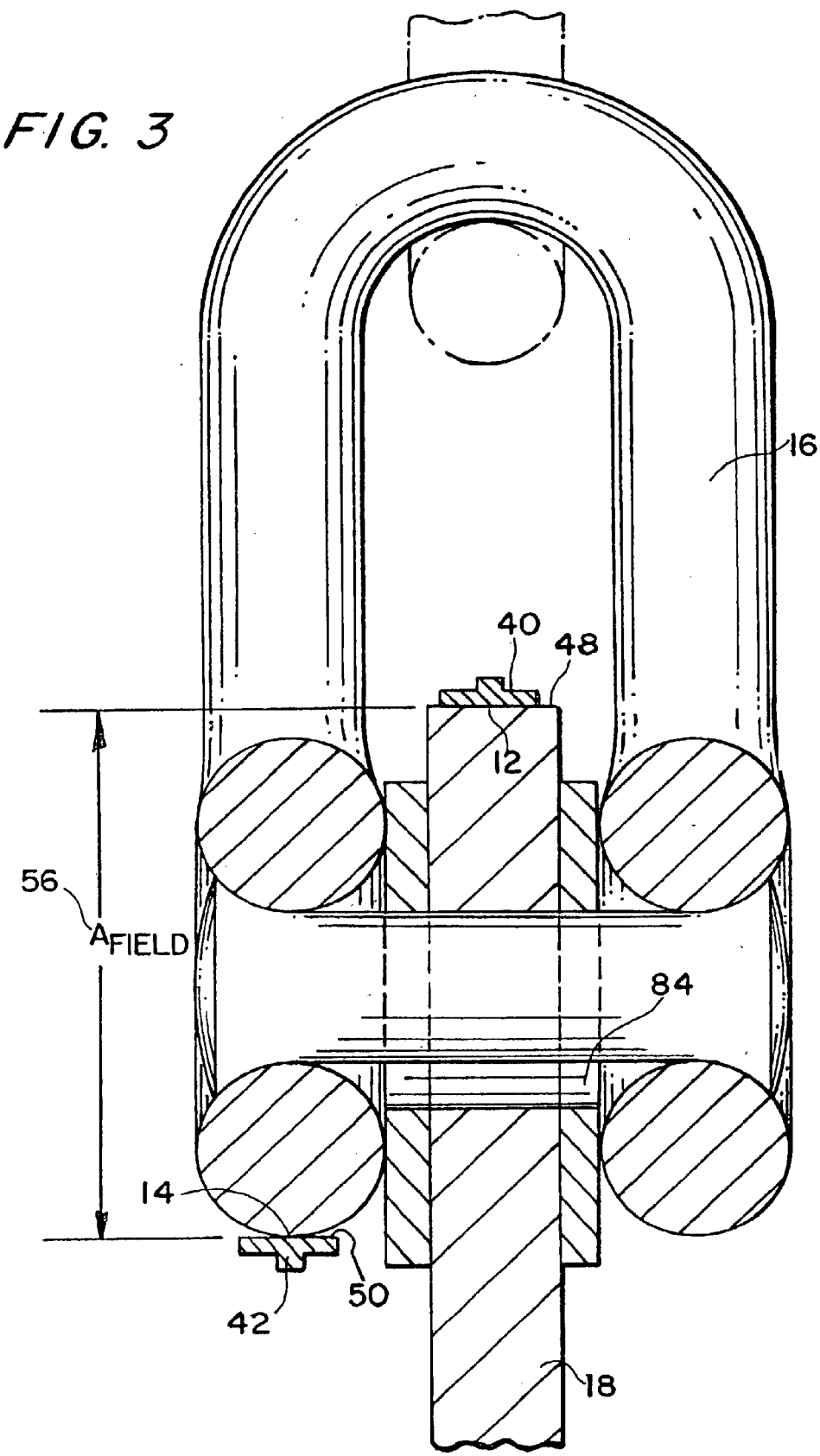
FIG. 3 is an elevational view, partially in cross-section, of the device of FIG. 2 after wear has occurred between the interconnected shackle and padeye.
Figure 5:
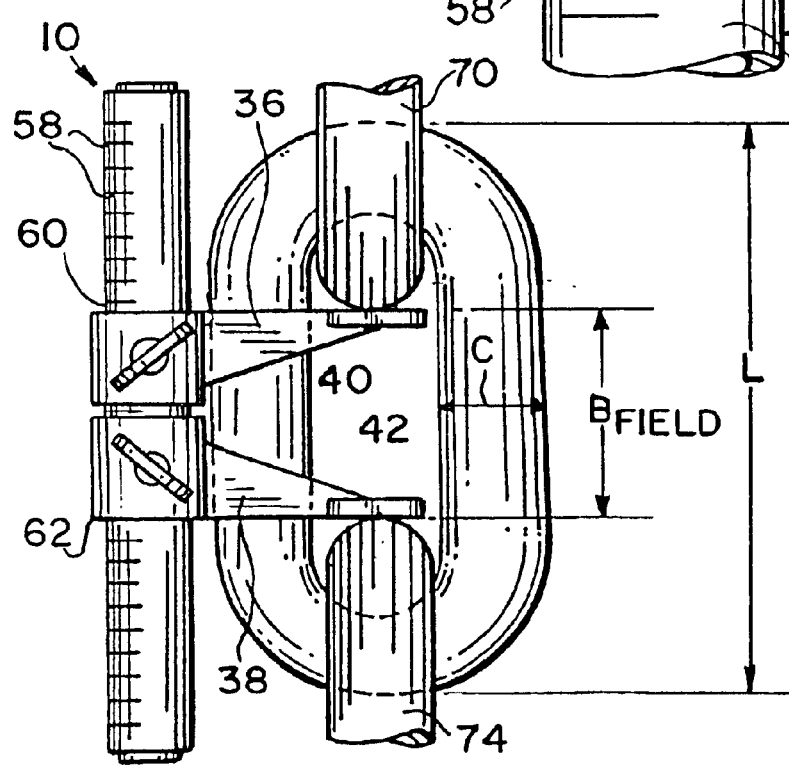
FIG. 5 is a side elevational view of the measurement device of FIG. 1, illustrating the measurement of a reference dimension associated with interconnected links of an exemplary chain.

Referring to the arm 24 in FIG. 1, the discussion of which applies equally to arm 26, the tubular section 32 allows a first slidable arm 24 to be oriented in one of two orientations: a first orientation with the arm portion 36 on the same side of the longitudinal axis 46 of the tube 20 as the arm portion 38 of the second slidable arm 26, as shown in FIG. 5; or a second orientation with the arm portion 36 on the opposite side of the longitudinal axis 46 of the tube 20 relative to the arm portion 38 of the second slidable arm 26, as shown in FIGS. 1–3.

The different orientations of the arms 24, 26 can be implemented by removing an arm, such as the arm 24 in a first vertical orientation by sliding the arm 24 off of the tube 20, and reinserting the tube 20 into the tubular section 32 upside-down; that is, with the arm 24 in a second vertical orientation opposite to the first vertical orientation, thus flipping the arm 24 over with respect to the previous orientation of the arm 24 in slidable engagement with the tube 20. Alternatively, the different orientations of the arms 24, 26 can be implemented by rotating an arm, such as the arm 24, about the longitudinal axis 46 to any selected angular orientation of the arm 24 relative to the other arm 26 with the longitudinal axis 46 of the tube 20 serving as a common origin in the vertical direction for the angular orientation of the arms 24, 26. Thus, the arms 24, 26 can be oriented in any angular and vertical spatial relationship to each other with respect to the tube 20.

The flat surfaces 40, 42 located at the ends of the arm portions 36, 38 of the slidable arms 24, 26, respectively, are placed into contact with selected reference surfaces 48, 50 of the fastening devices, such as the padeye 16 and shackle 18 in FIG. 1. The locking fasteners 28, 30 are then tightened to removably secure the slidable arms 24, 26 in each respective selected position along the longitudinal length of the tube 20. Accordingly, the arms 24, 26 can be positioned substantially adjacent respective points of contact with components and/or portions of the fastening device or devices, such as the interconnected padeye 16 and shackle 18 shown in FIGS. 1–3, or the interconnected chain links and optionally shackles shown in FIG. 5.

Referring now to FIG. 1 in conjunction with FIGS. 2–3, the slidable arms 24, 26 having the arm portions 36, 38 and flat surfaces 40, 42, respectively, are configured and dimensioned such that an associated inside distance 52, shown in FIG. 1, spanning between the slidable arms 24, 26 along the longitudinal length of the tube 20, is substantially equal to the reference dimensions 54, 56 to be measured, as shown in FIGS. 2–3.

Referring again to FIG. 1, the tube 20 includes an exterior surface which has visible indicia 58, for example, graduated markings using a predetermined scale, such as millimeters, and the indicia 58 can be relatively large to be readily seen and determined to be associated with a substantially adjacent portion of each of the slidable arms 24, 26, such as respective rims 60, 62 of the tubular sections 32, 34.

Additional indicia can be used on components of the measurement device 10, such as the indicia 64, 66, 68 representing arrows which are disposed on the tubular sections 32, 34, with each arrow of the indicia 64, 66, 68 pointing in a specific direction. In one embodiment, a tubular section can include one arrow, such as the tubular section 32 in FIG. 1 having a single arrow 60, or in another embodiment, the tubular section such as the tubular section 34 in FIG. 1, can have two arrows 66, 68, with each arrow 66, 68 pointing to a respective rim of the tubular section 32, such as the rim 62.

By providing arrows 64, 66, 68 as indicia on each tubular section 32, 34, the arrow shaped indicia 64, 66, 68 direct the sight of the measurer to the appropriate rim 60, 62 to readily read and/or record the substantially adjacent indicia 58 associated with each of the arms 24, 26.

The difference in values between respective indicia substantially adjacent respective portions of the pair of slidable arms 24, 26 determines the reference dimensions as the wear measurement.

In one embodiment, the arms 24, 26 are both slidably moveable along the length of the tube 20. In an alternative embodiment, one of the arms, such as the aim 24, can be in a fixed position on the tube 20, and so can lack the locking fastener 30 to be permanently fixed, for example, with the rim 62 substantially adjacent to a zero-mark of the indicia. Accordingly, in this alternative embodiment, the reference dimension can be readily read from the indicia 58 substantially adjacent to the rim 60 of the moveable arm 26.

Accordingly, with different measurements performed in different measurement events at different selected times, comparison can be made of measurements between measurement events, and so to allow the measurer to determine a total amount of wear at the points 12, 14 of contact between two components or portions of a single fastening device or combinations of fastening devices.

As shown in FIGS. 1–3, when measuring the reference dimensions between padeyes and shackles, the wear measurement device 10 is positioned adjacent to the connection point between the padeye 16 and the shackle 18, and then the two sliding arms 24, 26 are placed so that the flat surfaces 40, 42 on the sliding arms 24, 26 are facing toward each other. In this case, the lateral eccentricity between the flat surfaces 40, 42 on the sliding arms 24, 26 and the longitudinal axis 46 forming the center line of the tube 20 enables the flat surfaces 40, 42 to be out of plane with each other during the measurement of wear between adjacent interconnected components 16, 18, such as interconnected padeyes and shackles.

As shown in FIG. 5, when measuring the reference dimensions between shackles and chain links, as well as when measuring the reference dimensions between adjacent chain links, such as the example chain links 70, 72, 74, the two sliding arms 24, 26 are placed so that the flat surfaces 40, 42 on the sliding arms 24, 26 are facing outward away from each other. In this case, the lateral eccentricity enables the flat surfaces 40, 42 to be in line and in plane with each other for measurement of wear between interconnected shackles and chain links, or alternatively between interconnected and adjacent chain links.

Figure 4:
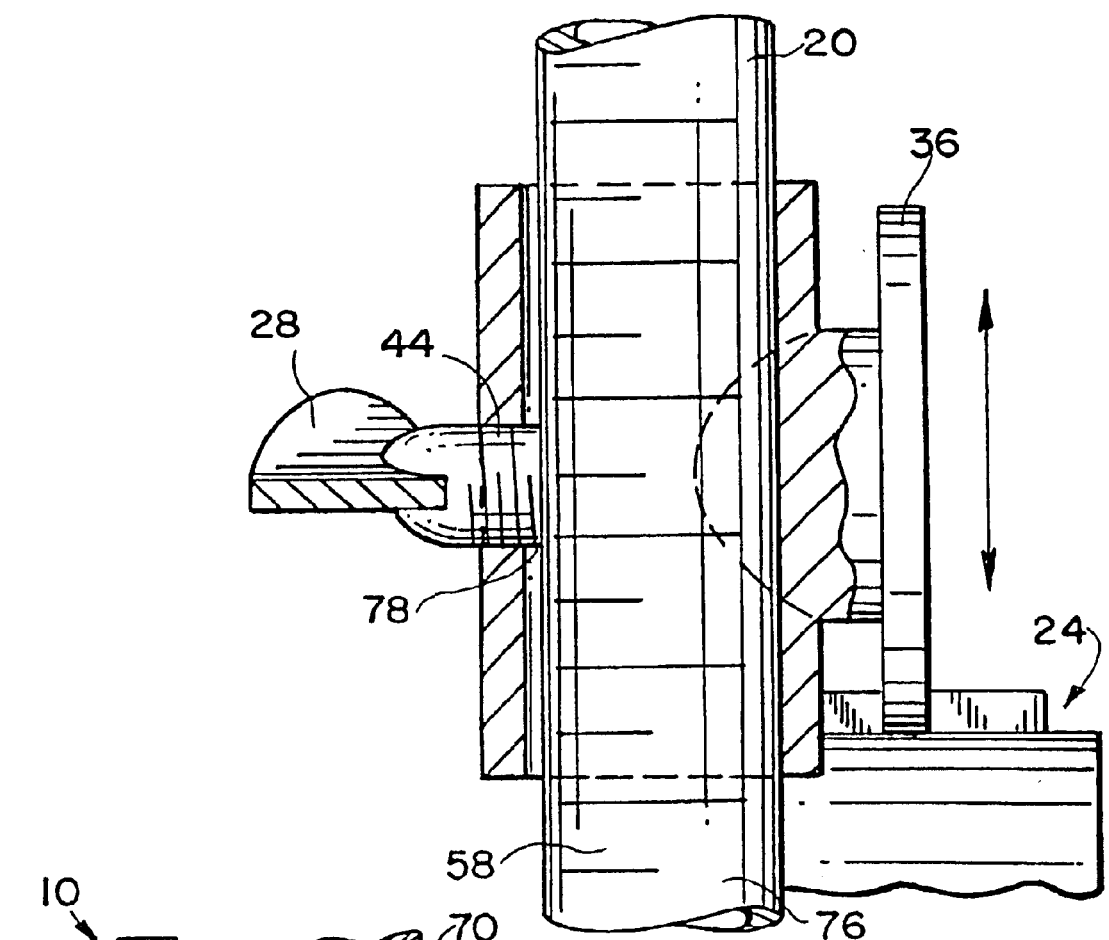
FIG. 4 is an elevational cross-sectional view of a portion of the measurement device taken along lines 4—4 of FIG. 1.

In an example referring to the arm 24 in FIG. 4, the discussion of which applies equally to the arm 26 shown in FIGS. 1 and 5, the arm 24 can be readily moved and secured to any selected location along the length of the tube 20. As shown in FIG. 4, the arm 24 is in a sliding engagement with the exterior surface 76 of the tube 20, allowing the arm 24 to move vertically with respect to the view in FIG. 4. The locking fastener 28 extends through the aperture 44 to be moved horizontally with respect to the view in FIG. 4, such that an end 78 of the locking fastener 28 can be moved from a direct abutment and contact with the exterior surface 76 in a frictional engagement to a positioned substantially adjacent but not contacting the exterior surface 76, allowing the arm 24 to be moved vertically to a selected position, and then allowing the locking fastener 28 to be moved horizontally to abut and fictionally engage the exterior surface 76 to removably secure the arm 24 to the selected location along the longitudinal length of the tube 20.

In an alternative embodiment, the sliding arms 24, 26 can be configured to be in a very close fit onto the tube 20 to enhance accuracy. In additional embodiments, the materials and dimensions constituting the wear measurement device 10 can be varied to make the device 10 neutrally buoyant for ease of use by divers to perform underwater measurements of wear.

In an alternative embodiment, the tube 20 shown in FIG. 1 can have a transparent and/or translucent exterior surface 76, such that a light source disposed in the interior of the tube 20 illuminates the indicia 58 for ease of viewing by the measurer, for example when measuring reference dimensions of interconnected components underwater or in dark or inaccessible locations. The light source can include a bulb or other light-emitting components such as light emitting diodes (LEDs), which can include or be connected to a power source, with the light source and/or power source located within the tube 20, for example, in a lower portion 80 of the tube 20, as shown in FIG. 1, such that the light source and/or power source is at a distance from the indicia 58 so as to not block the generated light from illuminating the indicia 58. In alternative embodiments, the indicia 58 can be photoluminescent and/or be composed of light emitting components such as LEDs connected to a power source.

In operation, the wear measurement device 10 can be used to determine a total wear value of a fastening devices in terms of predetermined measurement units, such as millimeters, and/or can be used to determine the actual wear of the fastening device relative to a new and/or unused fastening device in terms of percentage changes from the new, unworn state.

In a first embodiment, with a padeye 18 engaging a shackle 16, shown in FIGS. 1–3, the radius R represents the radius of the padeye 18, the diameter D represents the padeye hole diameter, the depth P represents the half-shackle pin depth, and the radius S represents the shackle palm radius.

For a new padeye 18 coupled to a new shackle 16 illustrated in FIG. 2, with a slight gap 82 present, the references dimension $A_{NEW}$, is determined by:

$$A_{NEW}=R-(D/2)+P+S.$$

As illustrated in FIG. 3, after some wear has occurred, any pre-existing gap 82 between the padeye and the shackle will have widened to be the gap 84, so the reference dimension $A_{FIELD}$ as measured in the field is determined by positioning the arm portions 36, 38 with respective surfaces 40, 42 of the slidable arms 24, 26 on the shackle 18 and the padeye 16, respectively.

The total combined wear of the padeye 18 and shackle pin from the new condition in FIG. 2 to the worn condition in FIG. 3 can be measured to be:

$$\text{Total Wear}=A_{NEW}-A_{FIELD}$$

and the actual wear, as a percentage change from the new condition, can be measured to be:

$$\text{Actual Wear (\%)}=100\times[A_{NEW}-A_{FIELD}]/A_{NEW}.$$

For example, for a new padeye and a new shackle, the associated dimensional parameters can be R=117.5 mm., D=95.4 mm., P=44.5 mm., and S=96 mm., so the new reference dimension is $A_{NEW}$=210.3 mm. If, using the wear measurement device 10, the field reference dimensions $A_{FIELD}$ is measured to be 195 mm., the total combined wear is about 15 mm., and the actual wear is about 7%.

In a second embodiment shown in FIG. 5, with an intermediate chain link 72 engaging either one or two shackles or one or two chain links, such as the two links 70, 74, the intermediate chain link 72 has a chain length L and a chain diameter C. The reference dimension $B_{NEW}$ of a new chain link is determined to be:

$$B_{NEW}=L-4C.$$

In the field, the reference dimension $B_{FIELD}$ is measured as shown in FIG. 5, with the arm portions 36, 38 with respective surfaces 40, 42 positioned on the same side of the longitudinal axis 46 of the tube 20, allowing both arm portions 36, 38 to be positioned between the ends of the adjacent chain links and/or shackles.

The total combined wear associated with the chain link is measured to be:

$$\text{Total Wear}=(B_{NEW}-B_{FIELD})/2$$

and the actual wear, as a percentage change from the new condition, can be measured to be:

$$\text{Actual Wear (\%)}=100\times[B_{NEW}-B_{FIELD}]/4C.$$

For example, for a new chain link, the associated dimensional parameters can be L=381 mm. and C=63.5 mm., so the new reference dimension is $B_{NEW}$=127 mm. If, using the wear measurement device 10, the field reference dimension $B_{FIELD}$ is measured to be 171 mm., the total combined wear is about 22 mm., and the actual wear is about 17%.

Accordingly, for numerous types of fastening devices such as padeyes, shackles, and chains, the wear measurement device 10 can be used to obtain accurate and reliable measurements of the predetermined dimensions $A_{NEW}$ and $B_{NEW}$ in new conditions before use and wear, and to obtain measurements in the field of the predetermined dimensions $A_{FIELD}$ and $B_{FIELD}$ of used components, and thus to determine total and actual wear of each measured component fastening device, such as chains and chain links, shackles, and padeyes.

Using the wear measurement device 10 and the total and actual wear measurements, maintenance workers can record such measurements and, for example, replace such components if a predetermined condition is met, for example, if the actual wear exceeds 20% or the total wear exceeds a predetermined value, e.g., 30 mm.

What is claimed is:

1. A measuring device comprising:
   a measurement tube having a longitudinally extending exterior with an associated longitudinal length and graduated dimensional indicia disposed longitudinally along an exterior surface; and
   a pair of tubular sections in slidable engagement relation with the measurement tube and positionable at selected locations along the length of the tube, with a respective portion of each tubular section capable of being placed substantially adjacent to a respective point of measurement on the measurement tube;
   an arm mounted to each said tubular sections, each said arm being spaced radially from the respective tubular section and extending generally perpendicular to said measurement tube, such that each said tubular section is positionable at selected locations along the measurement tube, a first of said arms being on a first side of longitudinal axis and a second of said arms being on the opposite side of said longitudinal axis, each said arm having a free end portion having a measurement surface for contact with a respective selected measurement location;

wherein the distance between the selected measurement locations substantially corresponds to the distance between the pair of points tubular sections and the distance is indicated on the graduated measurement tube.

2. The measuring device of claim 1, wherein a first of said arms is dimensioned and configured to contact a first point of measurement associated with a portion of a padeye; and wherein a second of said arms is dimensioned and configured to contact a point of measurement associated with a shackle in coupled engagement with the padeye.

3. The measuring device of claim 1, wherein a first of said arms is dimensioned and configured to contact a first element in coupled engagement with a first link chain, and a second of said arms is dimensioned and configured to contact a second element in coupled engagement with said link chain.

4. The measuring device of claim 3, wherein said first and second arms are dimensioned and adapted to contact the two separate elements, the two separate elements being second and third chain links.

5. The measuring device of claim 3, wherein the first and second arms are respectively dimensioned and adapted to contact, the two separate elements, the two separate elements being a second chain link and a shackle.

6. The measuring device of claim 1, wherein the measurement tube includes graduated indicia.

7. The measuring device of claim 1, further comprising:

a pair of locking fasteners, each locking fastener being structured and adapted for releasably locking a respective arm in the respective selected location along a length of the measurement tube.

8. A measuring device for measuring a distance between two components, comprising:

a measurement tube defining a longitudinal axis and having a longitudinally extending cylindrical exterior surface with an associated longitudinal length and graduated dimensional indicia disposed on and extending longitudinally along the exterior surface; and a pair of tubular sections in slidable relation with the exterior surface of the tube and positionable at selected locations along the longitudinal length of the exterior surface; and an arm mounted on each tubular section and extending away from the measurement tube and generally perpendicular to the longitudinally extending cylindrical exterior surface, a first set of said arms being on a first side of said longitudinal axis, and a second of said arms being on the opposite side of said longitudinal axis, an end of each arm capable of being positioned at respective selected locations, each arm being in contact with a respective surface of a respective one of the two components;

wherein the distance between the selected locations, as determined by the difference in the respective indicia associated with the selected locations along the longitudinal length of the exterior surface substantially corresponds to the distance between selected portions of the two components.

9. The measuring device of claim 8, wherein the first and second arms are respectively dimensioned and adapted to contact two components including a padeye and a shackle in a coupled engagement.

10. The measuring device of claim 8, wherein the first and second arms are respectively dimensioned and adapted to contact two components being two separate elements, each component being in coupled engagement with a first chain link.

11. The measuring device of claim 10, wherein the first and second arms are respectively dimensioned and adapted to contact two separate components which include second and third chain links.

12. The measuring device of claim 10, wherein the first and second arms are respectively dimensioned and adapted to contact two separate components which include a second chain link and a shackle.

13. The measuring device of claim 8, wherein the tubular sections each includes:

a circular rim at an open end of the tubular section, whereby the circular rim may be positioned substantially adjacent a respective indicia to be readily visible to the user.

14. The measuring device of claim 8, further comprising:

a pair of locking fasteners, each locking fastener associated with a respective arm and including a screw, each said screw extending through an aperture in the respective tubular section for releasably locking the respective tubular section in the respective selected location along the longitudinal length of the exterior surface of the measurement tube.

15. A method for measuring a distance between two components, the method comprising the steps of:

sliding a pair of arms in slidable relation with an exterior surface of a measurement tube along a longitudinal length of the exterior surface, the exterior surface of the tube being provided with graduated dimensional indicia, said measurement tube defining a longitudinal axis; and positioning the pair of arms at selected locations along a longitudinal length of the exterior surface, a first of said arms being on a first side of said longitudinal axis and a second of said arms being the opposite side of said longitudinal axis, thereby:

positioning a respective end of each arm adjacent to a respective selected surface of a respective one of the two components; and positioning a respective portion of a tubular section associated with each respective arm adjacent respective graduated indicia disposed on and extending longitudinally along the exterior surface;

wherein the distance between the selected locations, as determined by the difference in the respective indicia associated with the selected locations, substantially corresponds to the distance between selected portions of the two components.

16. The method of claim 15, further comprising the step of:

releasably locking a pair of locking fasteners to secure the tubular section of each respective arm in the respective selected location along the longitudinal length of the exterior surface.

* * * * *